United States Patent
Liang et al.

(10) Patent No.: US 12,363,523 B2
(45) Date of Patent: Jul. 15, 2025

(54) CONTROL PLANE FOR MULTI-SIM DEVICES

(71) Applicant: Apple Inc., Cupertino, CA (US)

(72) Inventors: Huarui Liang, Beijing (CN); Dawei Zhang, Saratoga, CA (US); Fangli Xu, Beijing (CN); Haijing Hu, Los Gatos, CA (US); Hao Duo, Beijing (CN); Longda Xing, San Jose, CA (US); Murtaza A. Shikari, Mountain View, CA (US); Sethuraman Gurumoorthy, San Ramon, CA (US); Shu Guo, Beijing (CN); Sree Ram Kodali, San Jose, CA (US); Srinivasan Nimmala, San Jose, CA (US); Srirang A. Lovlekar, Fremont, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 17/755,726

(22) PCT Filed: Nov. 28, 2019

(86) PCT No.: PCT/CN2019/121699
§ 371 (c)(1),
(2) Date: May 6, 2022

(87) PCT Pub. No.: WO2021/102833
PCT Pub. Date: Jun. 3, 2021

(65) Prior Publication Data
US 2022/0394458 A1    Dec. 8, 2022

(51) Int. Cl.
H04W 8/18    (2009.01)
H04W 88/06    (2009.01)

(52) U.S. Cl.
CPC .............. *H04W 8/183* (2013.01); *H04W 88/06* (2013.01)

(58) Field of Classification Search
CPC ......... H04W 8/18; H04W 8/183; H04W 8/20; H04W 8/205; H04W 8/24; H04W 88/02;
(Continued)

(56) References Cited

U.S. PATENT DOCUMENTS

| 2010/0273424 A1 | 10/2010 | De Petris et al. |
| 2016/0234782 A1 | 8/2016 | Su et al. |

(Continued)

FOREIGN PATENT DOCUMENTS

| CN | 101287255 | 10/2008 |
| CN | 101553055 | 10/2009 |

(Continued)

OTHER PUBLICATIONS

Intel et al., "Solution for Paging Reception with PO collision avoidance", 3GPP SA WG2 Meeting #S2-136, S2-1911942, Nov. 19, 2019, 4 sheets.

(Continued)

*Primary Examiner* — Siu M Lee
(74) *Attorney, Agent, or Firm* — Fay Kaplun & Marcin, LLP (57) ABSTRACT

A user equipment (UE) includes a first subscriber identification module (SIM) and a second SIM. The UE is configured to establish a first cellular network connection based on, at least, the first SIM and a second cellular network connection based on, at least, the second SIM. The UE sends, by the first SIM, a first registration request to the network, wherein the first registration request comprises an identification indicating the multi-SIM device is a type of multi-SIM device, receives, by the first SIM, a first registration accept message indicating the first registration (Continued)

request has been accepted, wherein the first registration accept message comprises a first temporary identification for the first SIM and sends, by the second SIM, an access network message comprising one of the first temporary identification or a further temporary identification based on, at least, the first temporary identification.

18 Claims, 7 Drawing Sheets

(58) Field of Classification Search
CPC ... H04W 88/06; H04W 60/00; H04W 60/005; H04W 76/00; H04W 76/10; H04W 76/15; H04W 76/20
See application file for complete search history.

(56) References Cited

U.S. PATENT DOCUMENTS

| | | | |
|---|---|---|---|
| 2017/0150545 A1 | 5/2017 | Ramkumar et al. | |
| 2022/0240213 A1* | 7/2022 | Ly | H04W 60/04 |
| 2022/0279470 A1* | 9/2022 | Tangudu | H04W 8/183 |
| 2022/0295265 A1* | 9/2022 | Jeong | H04W 12/37 |
| 2022/0330194 A1* | 10/2022 | Kumar | H04W 68/02 |
| 2022/0330202 A1* | 10/2022 | Kumar | H04W 60/00 |

FOREIGN PATENT DOCUMENTS

| | | |
|---|---|---|
| CN | 104661210 | 5/2015 |
| CN | 105873195 | 8/2016 |
| CN | 108377574 | 8/2018 |
| EP | 3528591 | 8/2019 |
| WO | 2017/128520 | 8/2017 |

OTHER PUBLICATIONS

Motorola Mobility et al., "Solution for MT service delivery when multiple USIMs are registered in the same serving PLMN" 3GPP SA WG2 Meeting #S2-136, S2-1911355, Nov. 8, 2019, 5 sheets.

LG Electronics, "Solution: MT Service notification for MUSIM UE", 3GPP TSG-SA2 Meeting #136, S2-1911482, Nov. 8, 2019, 4 sheets.

* cited by examiner

CONTROL PLANE FOR MULTI-SIM DEVICES

BACKGROUND

A user equipment (UE) may be equipped with a plurality of subscriber identification modules (SIMs) and each SIM may enable the UE to establish an independent network connection. For example, the UE may be equipped with a first SIM and a second SIM for dual-sim dual-standby (DSDS) functionality or dual-sim dual-active (DSDA) functionality. When in a DSDS or DSDA operating mode, the UE may establish a first network connection using the first SIM and a second network connection using the second SIM.

The network will treat each SIM as an independent UE even when the different SIMS are accessing the same public land mobile network (PLMN). This results in redundant signaling for the UE. For example, when the two (or multiple) SIMs are treated as separate UEs, the radio access network (RAN) may assign each UE to a different Access and Mobility Management Function (AMF). Thus, for mobility management, there will be redundant signaling because each UE will need to communicate with its respective AMF even though the SIMs are in the same physical device using the same hardware.

SUMMARY

According to an exemplary embodiment, a method is performed by a user equipment (UE) having a first subscriber identification module (SIM) and a second SIM, wherein the UE is configured to establish a first cellular network connection based on, at least, the first SIM and a second cellular network connection based on, at least, the second SIM. The method includes sending, by the first SIM, a first registration request to the network, wherein the first registration request comprises an identification indicating the multi-SIM device is a type of multi-SIM device, receiving, by the first SIM, a first registration accept message indicating the first registration request has been accepted, wherein the first registration accept message comprises a first temporary identification for the first SIM and sending, by the second SIM, an access network message comprising one of the first temporary identification or a further temporary identification based on, at least, the first temporary identification.

Further exemplary embodiments include a user equipment (UE) having a first subscriber identification module (SIM) and a second SIM. The UE also includes a transceiver configured to establish a first cellular network connection based on, at least, the first SIM and a second cellular network connection based on, at least, the second SIM. The UE further has a processor configured to send a first registration request to the network for the first SIM, wherein the first registration request comprises an identification indicating the multi-SIM device is a type of multi-SIM device, receive a first registration accept message indicating the first registration request has been accepted, wherein the first registration accept message comprises a first temporary identification for the first SIM and send an access network message for the second SIM comprising one of the first temporary identification or a further temporary identification based on, at least, the first temporary identification.

Still further exemplary embodiments include a method performed by a network. The method includes receiving a first registration request from a first SIM of a multi-SIM device, wherein the first registration request comprises an identification indicating the multi-SIM device is a type of multi-SIM device, assigning the first SIM to a mobility management function of the network, sending a first registration accept message to the first SIM indicating the registration was successful and further including a first temporary identification assigned to the first SIM and receiving, from the second SIM, an access network message comprising one of the first temporary identification or a further temporary identification based on, at least, the first temporary identification.

Additional exemplary embodiments include a further method performed by a network. The method includes receiving a registration request from a first SIM of a multi-SIM device, wherein the registration request comprises an identification of the multi-SIM device, a first non-access stratum (NAS) message for the first SIM and a second NAS message for a second SIM of the multi-SIM device, decoding the first NAS message and the second NAS message and associating the first SIM and the second SIM with the identification of the multi-SIM device.

DETAILED DESCRIPTION

The exemplary embodiments may be further understood with reference to the following description and the related appended drawings, wherein like elements are provided with the same reference numerals. The exemplary embodiments describe manners of registering a multi-SIM device with a network such that the network has an understanding that each of the SIMS are included in a single multi-SIM device, thereby reducing network signaling during various operations.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The UE may establish a connection to a network by camping on a cell of the network. In one example, the network may be a 5G New Radio (NR) network and the cell may be a next generation Node B (gNB). However, reference to a particular network or a particular type of cell is merely provided for illustrative purposes, those skilled in the art will understand that the network may be any type of network and the cell may be any type of cell within the corresponding network.

Various exemplary embodiments are described with regard to a UE that is equipped with a first subscriber identification module (SIM) and a second SIM for dual-sim dual-standby (DSDS) functionality dual-sim dual-active (DSDA) functionality. When in a DSDS or DSDA operating mode, the UE may establish a first network connection using the first SIM and a second network connection using the second SIM. The first and second network connections may each be independent from one another and exist simultaneously. Thus, each SIM may be associated with its own telephone number and/or subscription with a cellular service provider. Accordingly, DSDS and DSDA enables a single UE to be associated with two different telephone numbers and/or subscriptions. Throughout this description, for the purposes of differentiating between SIMs, reference will be made to SIM 1 and SIM 2. However, this is only intended to differentiate between the two SIMs and is not intended to indicate any sort of priority/preference between either SIM 1 or SIM 2.

A person of ordinary skill in the art would understand that a SIM contains information that is required for a UE to establish a network connection. For example, the SIM may include an international mobile subscriber identifier (IMSI) that may be used for authentication with the network provider. In the context of DSDS and DSDA, a user may have a first subscription with a cellular service provider that is enabled by SIM 1 and a second subscription with the cellular service provider that is enabled by SIM 2. In one example, the same cellular service provider is associated with both SIM 1 and SIM 2. In another example, a different cellular service provider is associated with each SIM. Reference to any particular type of information being included in a SIM is merely provided for illustrative purposes. A SIM may include a wide variety of different types of information that different networks or entities may refer to by different names. Accordingly, the exemplary embodiments may apply to a SIM that contains any type of information used by the UE to establish a network connection.

The exemplary embodiments will be described with respect to a UE having two SIMs. However, those skilled in the art will understand that the exemplary embodiments may also apply to devices that have more than two SIMs.

The exemplary embodiments relate to a control plane that may be used to reduce signaling for multi-SIM devices during mobility management operations. The exemplary embodiments provide multiple examples of methods of registering a multi-SIM UE with a network where each of the SIM cards is associated with a common mobility management function. In addition, the exemplary registration methods inform the network of the relationship between the SIM cards (e.g., the SIM cards are included in the same physical device) such that the network may take appropriate actions with respect to the each of the SIM cards in the multi-SIM UE. These actions include the above mentioned mobility management functions and other actions including data transfers, paging, etc.

Figure 1:
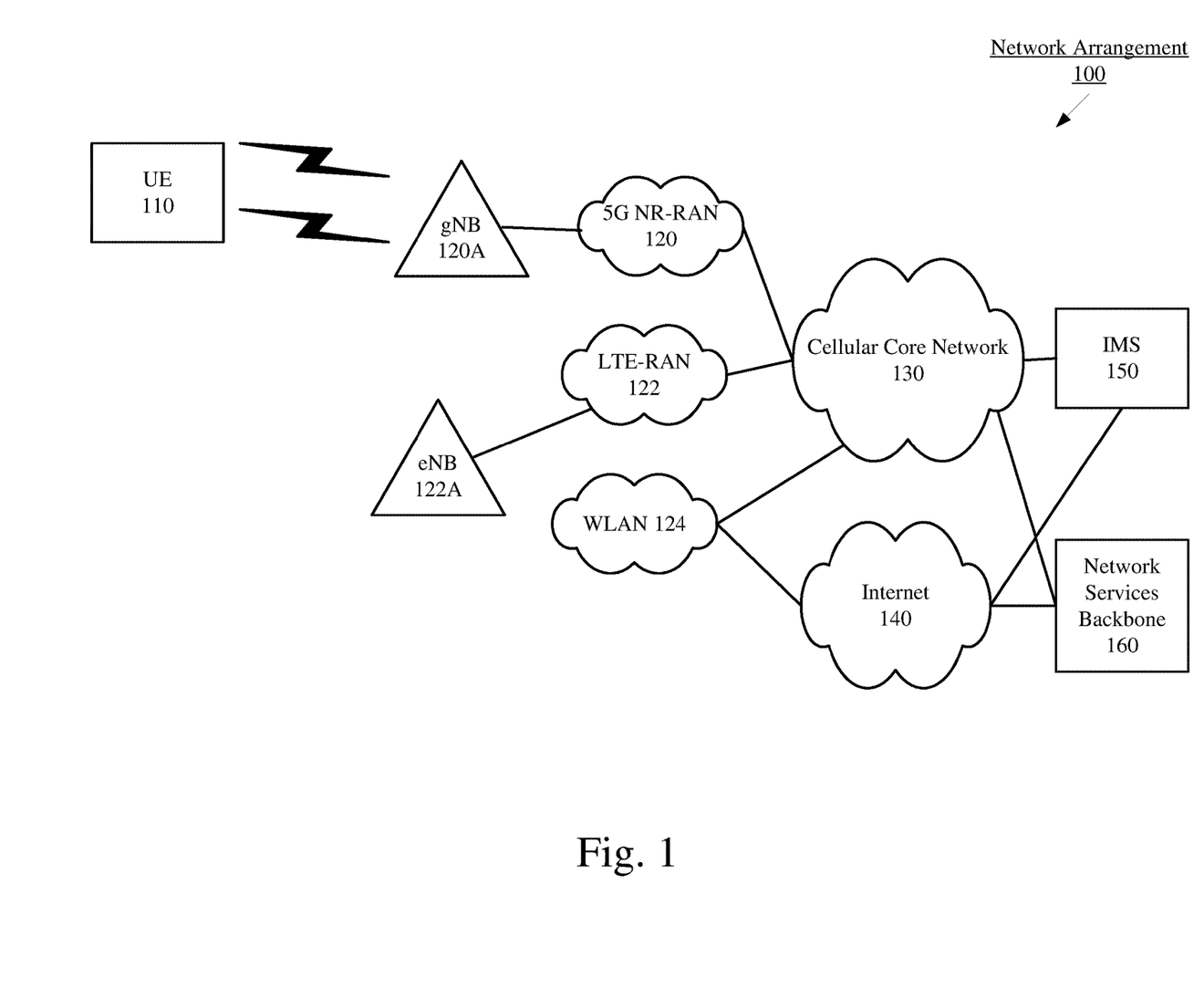
FIG. 1 shows an exemplary network arrangement according to various exemplary embodiments described herein.

FIG. 1 shows a network arrangement 100 according to the exemplary embodiments. The network arrangement 100 includes a UE 110 that includes at least two SIMs. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may communicate with one or more networks. In the example of the network configuration 100, the networks with which the UE 110 may wirelessly communicate are a 5G New Radio (NR) radio access network (5G NR-RAN) 120, a LTE radio access network (LTE-RAN) 122 and a wireless local access network (WLAN) 124. However, the UE 112 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The UE 110 may be configured with DSDS or DSDA functionality. Accordingly, the UE 110 may establish a first network connection using SIM 1 and a second network connection with a network using SIM 2. The first network connection and the second network connection may be independent from one another and exist simultaneously. In the example of the network configuration 100, the UE 110 is camped on the gNB 120A for both the first and second network connections. However, this is merely provided for illustrative purposes. In an actual network arrangement, the UE 110 may camp on a first cell corresponding to a first network for the first network connection and a second cell corresponding to a second network for the second network connection.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The base stations (e.g., the gNB 120A, the eNB 122A) may include one or more communication interfaces to exchange data and/or information with camped UEs, the corresponding RAN, the cellular core network 130, the internet 140, etc. Further, the base stations may include a processor configured to perform various operations. For example, the processor of the base station may be configured to perform operations related to link management. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on each of SIM 1 and SIM 2). In the case of the dual SIM device UE 110, each SIM will independently connect to the corresponding network. Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120). As mentioned above, the use of the 5G NR-RAN 120 is for illustrative purposes and any type of network may be used.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
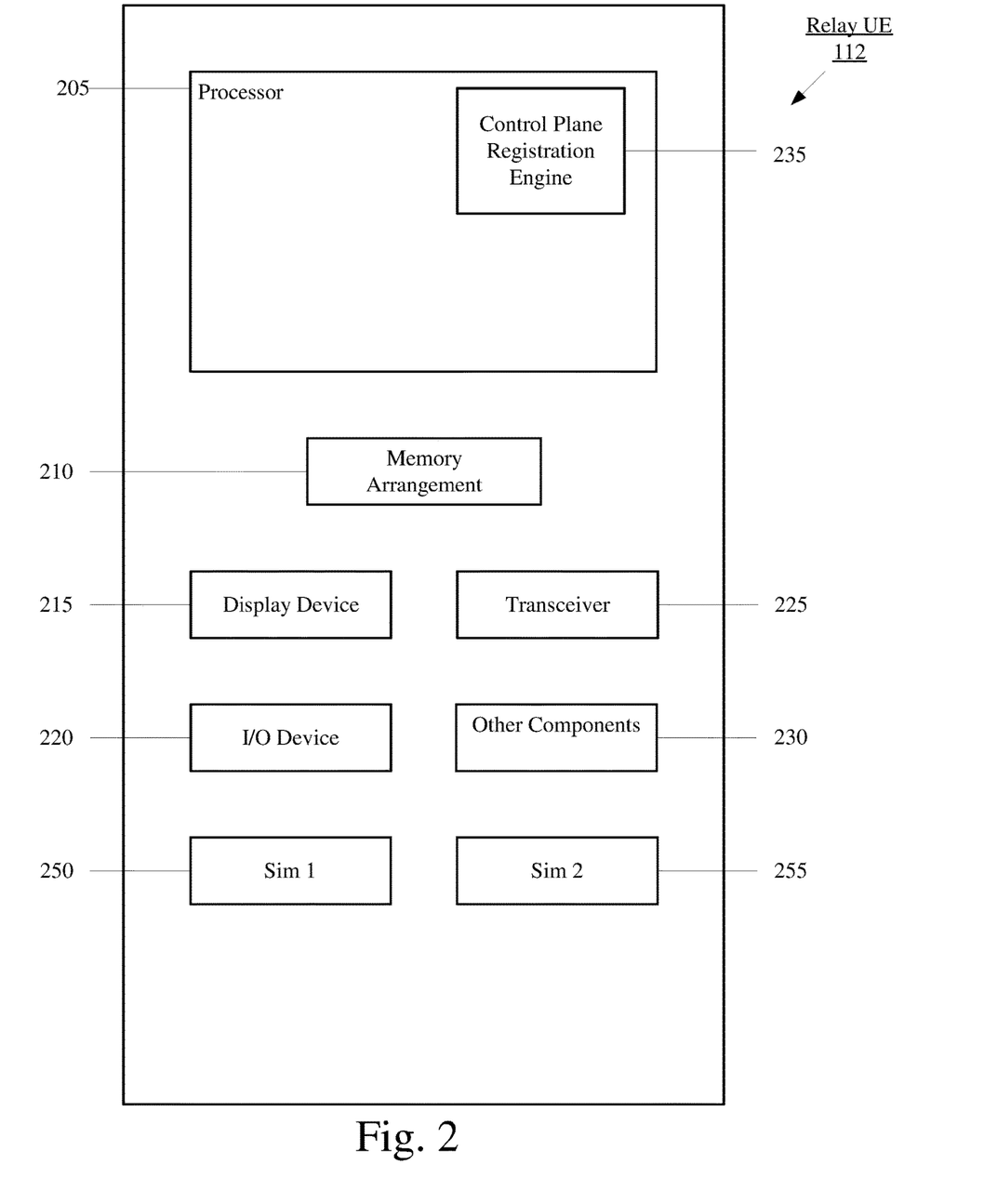
FIG. 2 shows an exemplary UE according to various exemplary embodiments described herein.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 may also be considered a multi-SIM device because it includes a first SIM 250 and a second SIM 255.

The processor 205 may be configured to execute a plurality of engines for the UE 110. For example, the engines may include a control plane registration engine 245. The control plane registration engine 245 may perform operations related to registering the multi-SIM UE 110 with one or more networks. Examples of the operations related to registering the UE 110 with a network will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the UE 110. As will be described in further detail below, the memory 210 may store data associated with the conditions of the UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR RAN 120, the legacy RAN 122, the WLAN 124, etc. Accordingly, the transceiver 225 may operate on a variety of different frequencies or channels (e.g., set of consecutive frequencies).

Figure 3:
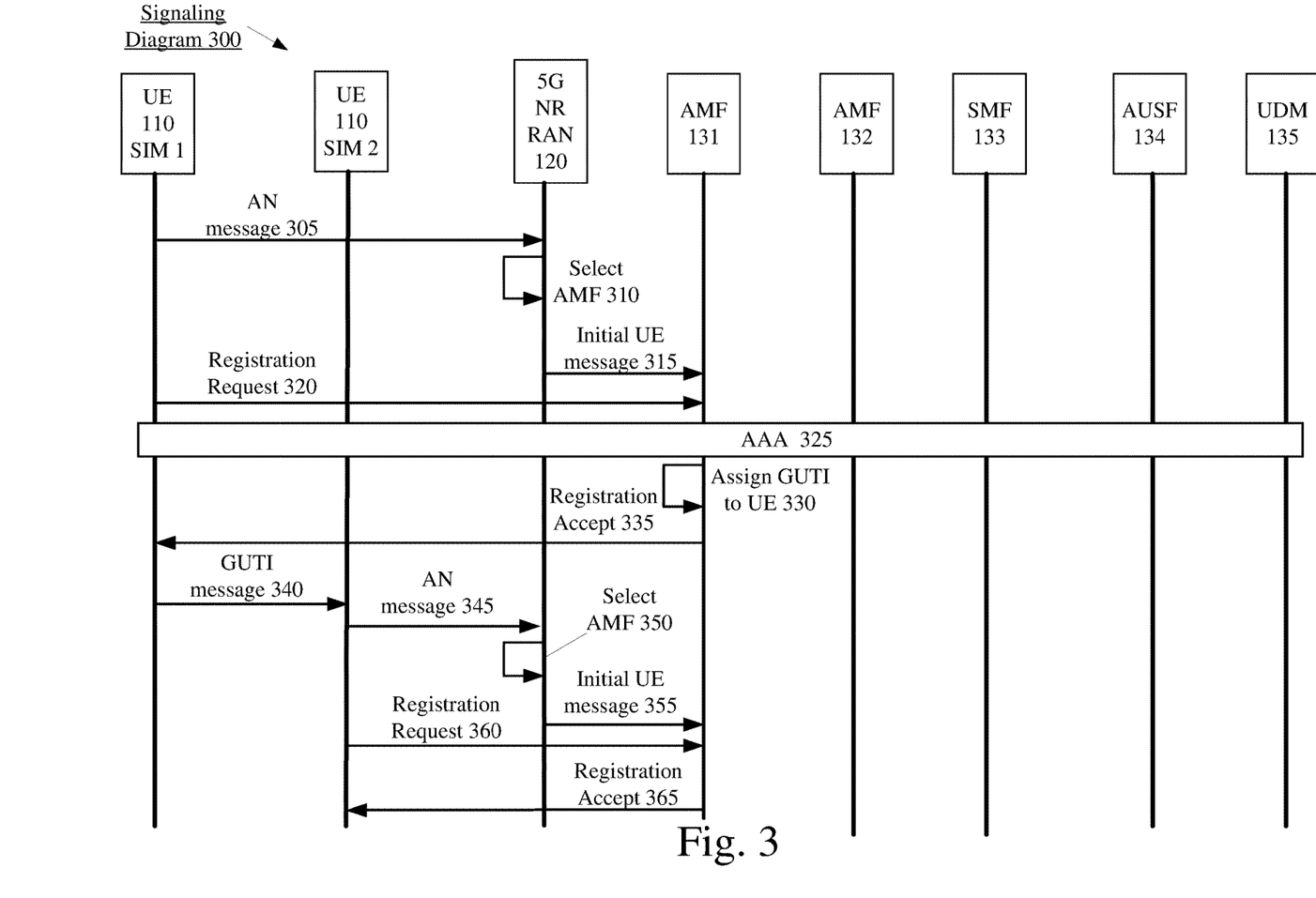
FIG. 3 shows an exemplary signaling diagram showing control plane signaling for registering a multi-SIM device according to various exemplary embodiments.

FIG. 3 shows an exemplary signaling diagram 300 showing control plane signaling for registering a multi-SIM device 110 according to various exemplary embodiments. FIG. 3 will be described with regard to the network arrangement 100 of FIG. 1 and the UE 110 of FIG. 2. In this exemplary embodiment, the control plane will cause the SIM 1 and the SIM 2 of the UE 110 to be registered and managed by the same Access and Mobility Management Function (AMF) within the network. In addition, the AMF will understand that the SIM 1 and the SIM 2 are within the same UE 110 and be able to perform mobility management for both SIMs with more limited signaling than if the SIMs were registered with different AMF functions or if the AMF did not understand that the SIMs were related (e.g., in the same UE 110).

Prior to discussing the signaling in FIG. 3, the specific components performing the signaling will be described. Starting from the left of FIG. 3, the first component is the SIM 1 of the UE 110 and the second component is the SIM 2 of the UE 110. It should be understood that while the SIMs are described as separate components, the SIMS are included in the same physical UE. In some instances, the SIMs may share hardware, firmware and software (e.g., the SIMs share one or more transmission/receiving chains) of the UE 110 and in other instances may have dedicated hardware, firmware and software (e.g., the SIMs have dedicated transmission/receiving chains).

The next component is the 5G NR-RAN 120. As discussed above, the SIM 1 and SIM 2 may simultaneously access the 5G NR-RAN 120 via the same gNB (e.g., gNB 120A) or may access the 5G NR-RAN 120 using different gNBs. In the example of the signaling diagram 300, the SIM 1 and SIM 2 are shown as accessing the same 5G NR-RAN. However, this is not a requirement of the exemplary embodiments.

The remaining components/functionalities may be considered to reside in the core network 130. However, those skilled in the art will understand that these components/ functionalities may reside in other portions of the network (e.g., the 5G NR-RAN 120) or may be distributed among various portions of the network. The next component is the AMF 131. The AMF 131 is generally responsible for mobility management in the 5G NR-RAN 120. For example, the AMF 131 may be responsible for managing handovers between gNBs. The next component is a second AMF 132. Those skilled in the art will understand that a typical network will have multiple AMF functions and different UEs may be assigned to different AMFs. The second AMF 132 will not participate in any of the signaling in the signaling diagram 300 as it is provided to show that, conventionally, the SIM 1 and SIM 2 may register with different AMFs as was described above. However, the exemplary embodiments provide that the SIMs will be registered with the same AMF to reduce mobility management signaling.

The next component is a Session Management Function (SMF) 133. The SMF 133 may be responsible for creating, updating and removing Protocol Data Unit (PDU) sessions for UEs. As will be described in greater detail below, in some exemplary embodiments, SIM 1 and SIM 2 of the UE 110 will be registered as the same device within the exemplary control plane. Thus, individual PDUs will be used to distinguish between SIM 1 and SIM 2. Thus, the SMF 133 may be responsible for identifying the individual PDU sessions. However, in this exemplary embodiment, the SIM 1 and SIM 2 will be separately identified and therefore the PDU sessions may not be needed to identify the different SIMs.

The next component is an Authentication Server Function (AUSF) 134. The AUSF 134 is generally responsible for subscriber authentication during registration or re-registration. The next component is a Unified Data Management (UDM) 135. The UDM 135 is generally responsible for providing data to the other functions. For example, the UDM 135 may provide the AMFs 131 and 132 and the SMF 133 with data to perform the corresponding functions. In another example, the UDM 135 may generate authentication vector for the AUSF 134. Those skilled in the art will understand that while each of these elements were referred to as components this does not mean that each is a discrete physical component. Rather, the functionalities of each of these components may be implemented in hardware, firmware or software by one or more network device including cloud implementations.

In 305, the SIM 1 of UE 110 may transmit an access network (AN) message to the 5G NR-RAN 120 (e.g., via gNB 120A). In 310, the 5G NR-RAN 120 may then select an AMF to which the SIM 1 of the UE 110 is to be assigned. In this example, it may be considered that the 5G NR-RAN selected AMF 131.

In 315, the 5G NR-RAN 120 will transmit an initial UE message to the AMF 131. The initial UE message may include a random identification that has been assigned to the UE 110. The purpose of the random identification will be described in greater detail below.

In 320, the SIM 1 will then send a registration request that will be directed to the AMF 131. The registration request may include information that identifies the UE 110 as a multi-SIM device. That is, upon receiving the registration request, the AMF 131 will understand that the AMF may receive a further registration request from a different SIM of the same UE 110 because the UE 110 has been identified to the AMF 131 as a multi-SIM device.

In 325, an authentication, authorization, and accounting (AAA) procedure may be performed to allow SIM 1 of the UE 110 to access the 5G NR-RAN 120. Those skilled in the art will understand the general operations that occur during the AAA procedure and the specifics of this procedure are not relevant to the exemplary embodiments. If the AAA procedure is successful, in 330, the AMF 131 will then assign a Global Unique Temporary Identifier (GUTI) to the UE 110. The GUTI may be considered a temporary identifier that is unique to the UE 110 and is generally used to keep the international mobile subscriber identity (IMSI) confidential.

In 335, the AMF 131 may then transmit a registration accept message to the SIM 1 of the UE 110. The registration accept message may include information such as the GUTI and an identification of a registration area. However, those skilled in the art will understand that additional information may be included in the registration accept message. In 340, the SIM 1 may then inform SIM 2 of the assigned GUTI in a GUTI message. Since the SIM 1 and the SIM 2 reside in the same physical device (e.g., UE 110), this GUTI message may be an internal message within the UE 110. From this point in the description, the GUTI that was assigned in 330 will be referred to as GUTI-1. As will be described in greater detail below, this is because SIM 2 may be assigned a GUTI-2.

In 345, the SIM 2 of UE 110 may also transmit AN message to the 5G NR-RAN 120 (e.g., via gNB 120A). The AN message may include a Serving Temporary Mobile Subscriber Identity (S-TMSI). The S-TMSI may be considered to be a shortened version of the GUTI-1 that was identified to the SIM 2 via the GUTI message 340 from the SIM 1. Upon receipt of the AN message, the 5G NR-RAN 120 will understand that the AN message is from a SIM in the same UE as the GUTI-1 identifies. Thus, in 350, when the 5G NR-RAN 120 selects an AMF to which the SIM 2 of the UE 110 is to be assigned, the 5G NR-RAN 120 will select the same AMF 131 as for the SIM 1.

In 355, the 5G NR-RAN 120 will then transmit an initial UE message to the AMF 131. However, in this initial UE message, the random identification that was in the first initial UE message sent in 315 will be replaced with the S-TMSI. This will identify to the AMF 131 that the SIM 2 is included in the same UE 110 as the SIM 1.

In 360, the SIM 2 will then send a registration request that will be directed to the AMF 131. The registration request may also include information that identifies the UE 110 as a multi-SIM device. In 365, the AMF 131 may then transmit a registration accept message to the SIM 2 of the UE 110. The registration accept message may include information such as a GUTI-2 and an identification of a registration area.

The GUTI-1 and GUTI-2 may be assigned by the AMF 131 as follows:

GUTI-1=GUAMI+5G-TMSI1

GUTI-2=GUAMI+5G-TMSI2

The GUAMI (Globally Unique AMF Identifier) uniquely identifies the AMF 131. The GUAMI may include information such as the mobile country code (MCC), the mobile network code (MNC), the AMF region, the AMF set ID that identifies the AMF set within the AMF region and the AMF pointer that identifies the AMF within the AMF set. The 5G-TMSI refers to a Temporary Mobile Subscriber Identity that is assigned to the individual SIM.

Figure 4:
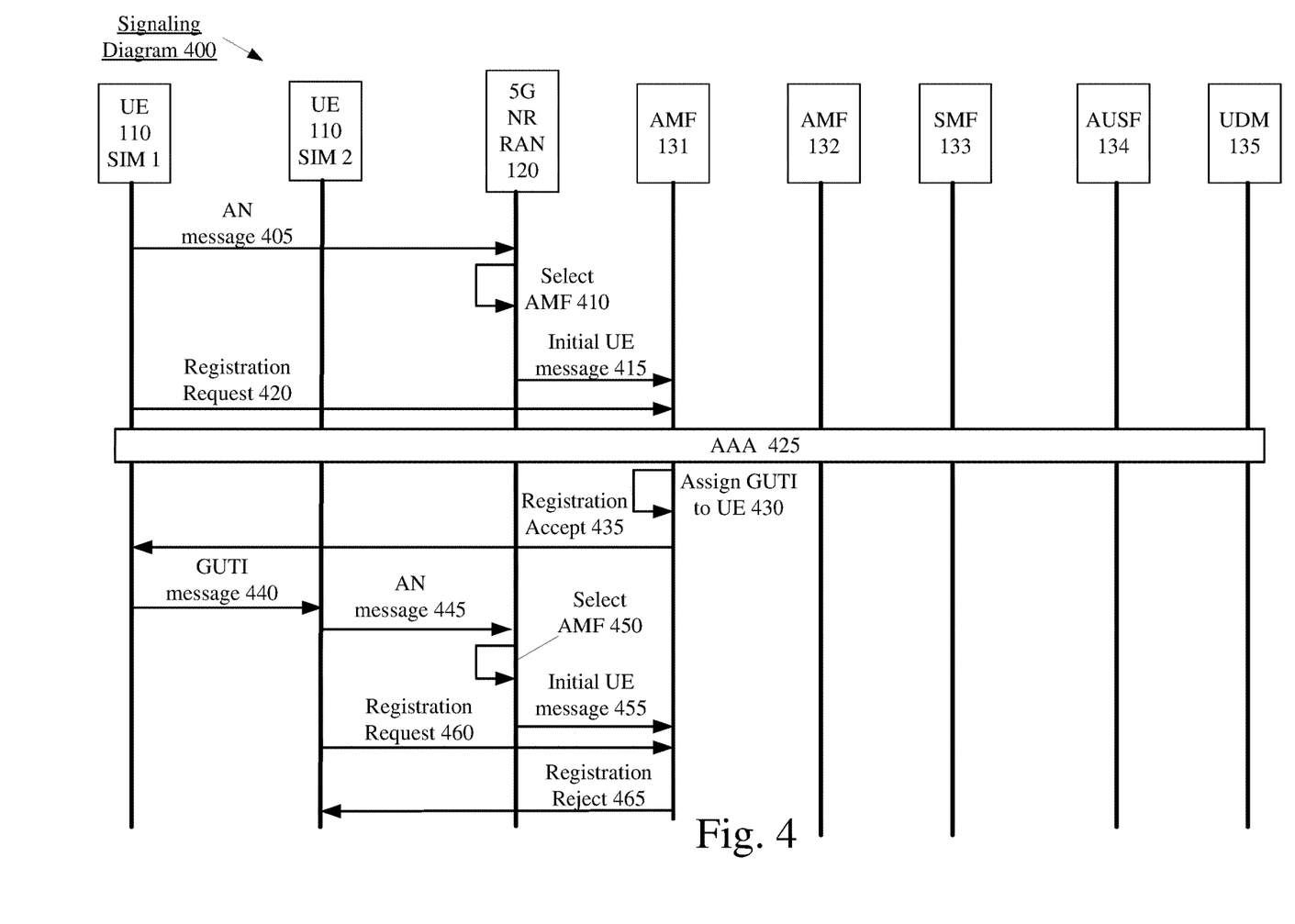
FIG. 4 shows a second exemplary signaling diagram showing control plane signaling for registering a multi-SIM device according to various exemplary embodiments.

FIG. 4 shows a second exemplary signaling diagram 400 showing control plane signaling for registering a multi-SIM device 110 according to various exemplary embodiments. FIG. 4 will be described with regard to the network arrangement 100 of FIG. 1 and the UE 110 of FIG. 2. In this exemplary embodiment, the control plane will cause the SIM 1 and the SIM 2 of the UE 110 to be registered as the same device (e.g., with the same GUTI). Since SIM 1 and SIM 2 have the same GUTI, they will be managed by the same AMF within the network. For purposes of distinguishing the SIM 1 and SIM 2 for communications, the individual PDU sessions of the SIM 1 and SIM 2 will be identified as will be described in greater detail below.

The signaling 405-460 may be substantially similar to the signaling 305-360 as described above with reference to FIG. 3. Thus, the description of 305-360 is incorporated into the signaling diagram of FIG. 4 and these operations will not be described again.

Unlike the example of FIG. 3, in 460, the registration request of the SIM 2 will not be accepted. In 465, the AMF 131 will send a registration reject message. The registration reject message may inform the SIM 2 that the registration request has been rejected and that the SIM 2 will share the same non-access stratum (NAS) procedure as SIM 1. Thus, both SIM 1 and SIM 1 will be assigned the same GUTI by the same AMF 131. Thus, for the purposes of mobility management, the SIM 1 and the SIM 2 will be treated the same and similar to the example of FIG. 3 provided above, the signaling required for mobility management will be reduced compared to the SIM 1 and SIM 2 being registered with different AMFs or being unrelated within the same AMF.

Figure 5:
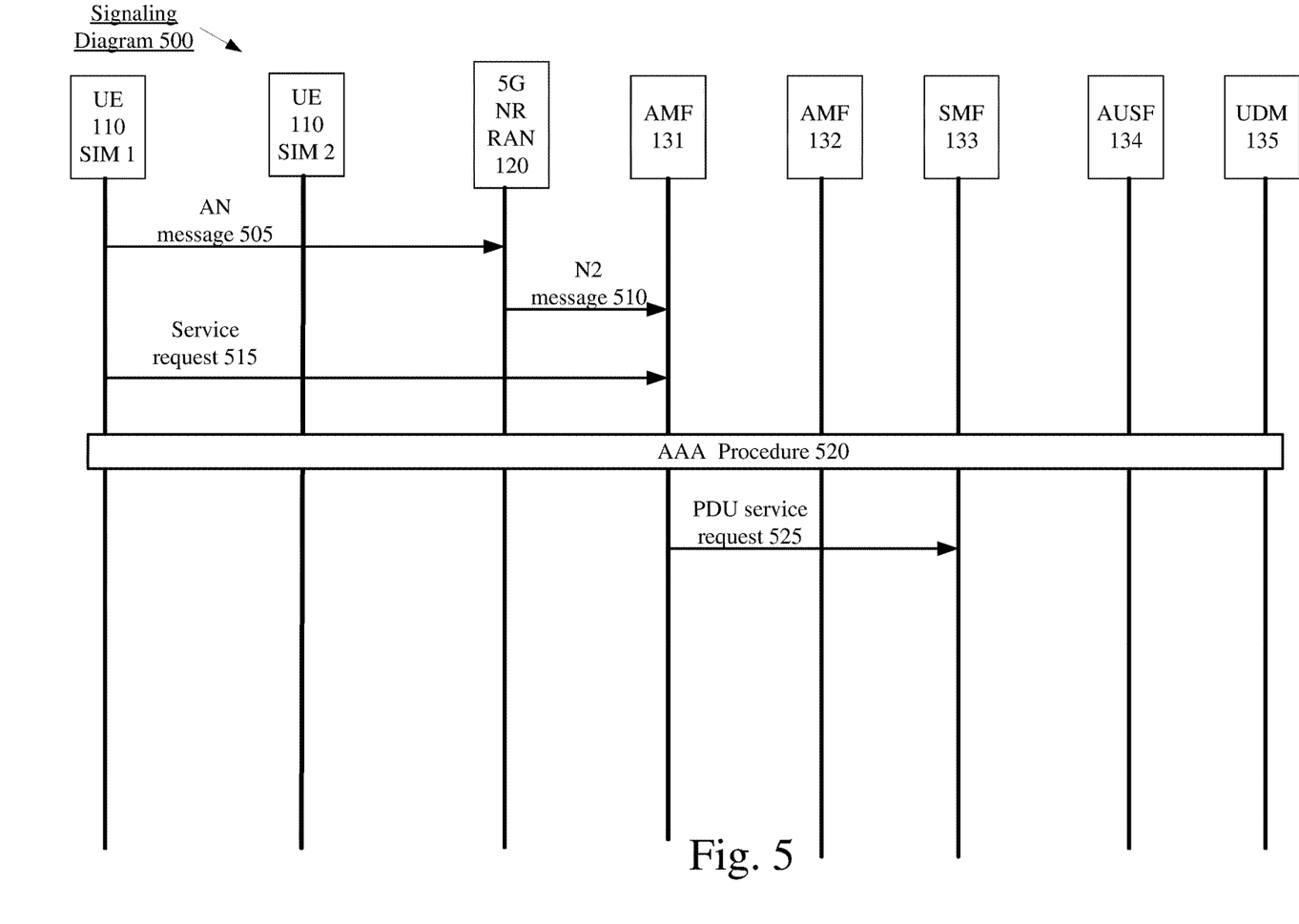
FIG. 5 shows an exemplary signaling diagram to perform a service request for the multi-SIM device after registering using the signaling of FIG. 4.

Since, at the conclusion of the signaling of FIG. 4, the SIM 1 and the SIM 2 have the same GUTI, there should be a manner to distinguish between the different SIMs for service requests. FIG. 5 shows an exemplary signaling diagram 500 to perform a service request for the multi-SIM device 110 after registering using the signaling 400 of FIG. 4.

It may be considered that the SIM 1 and SIM 2 of the UE 110 are registered with the AMF 131 and are assigned the same GUTI as described above with respect to FIG. 4. When the SIMs are registered, it may then be considered that one of the SIMs, in this case, SIM 1 has a service request for the 5G NR-RAN 120. However, the signaling described with respect to FIG. 5 could be performed in the same manner if the SIM 2 has the service request.

In 505, SIM 1 may transmit an AN message to the 5G NR-RAN 120 indicating that the SIM 1 has a service request. The service request may be, for example, to create a PDU session for the SIM 1. The AN message may include identifying information that identifies the message as originating with SIM 1. In 510, the 5G NR-RAN 120 may then transmit an N2 message to the AMF 131 indicating the service request including the identification that the service request is originating from SIM 1. In 515, SIM 1 may then transmit the service request to the AMF 131 that will understand the service request is being received from SIM 1 of the UE 110. In 520, an AAA procedure may be performed to authenticate the SIM 1 for the purposes of the service request.

Since this service request is for a PDU session, in 525, the AMF 131 will send a PDU session request to the SMF 133, e.g., the component that controls PDU sessions. As part of this, PDU session request, the AMF 131 will include data that may identify the PDU session with the SIM 1. Thus, the SMF 133 will understand that when the PDU session is created that the PDU session is associated with SIM 1 even though SIM 1 and SIM 2 have the same GUTI. For example, a typical PDU session request may include, for example, the Single-Network Slice Selection Assistance Information (S-NSSAI) associated with the PDU session, the data network name (DNN) for the PDU session, the Network Slice Instance ID for the PDU session, the PDU session ID, the SMF identifier and SMF address for the PDU session, the access type for the PDU session, the EPS Bearer Identity (EBI) and associated Allocation and Retention Priority (ARP) pairs for the PDU session, etc. In the exemplary embodiment, the AMF 131 may further include an indicator that identifies the PDU session to the requesting device (e.g., SIM 1 in this example). Thus, the SMF 133 will understand that the PDU session is associated with the SIM 1.

Because the SMF 133 will understand the SIM with which a particular PDU session is associated, the fact that the two SIMs have the same GUTI will not affect the delivery of service or data to the SIMs. For example, the SMF 133 may add the SIM 1 identifying information into any later context for the PDU session. This association of PDU session with the SIM 1 in this example will aid in sending pages and downlink data to the correct SIM of the UE 110.

Figure 6:
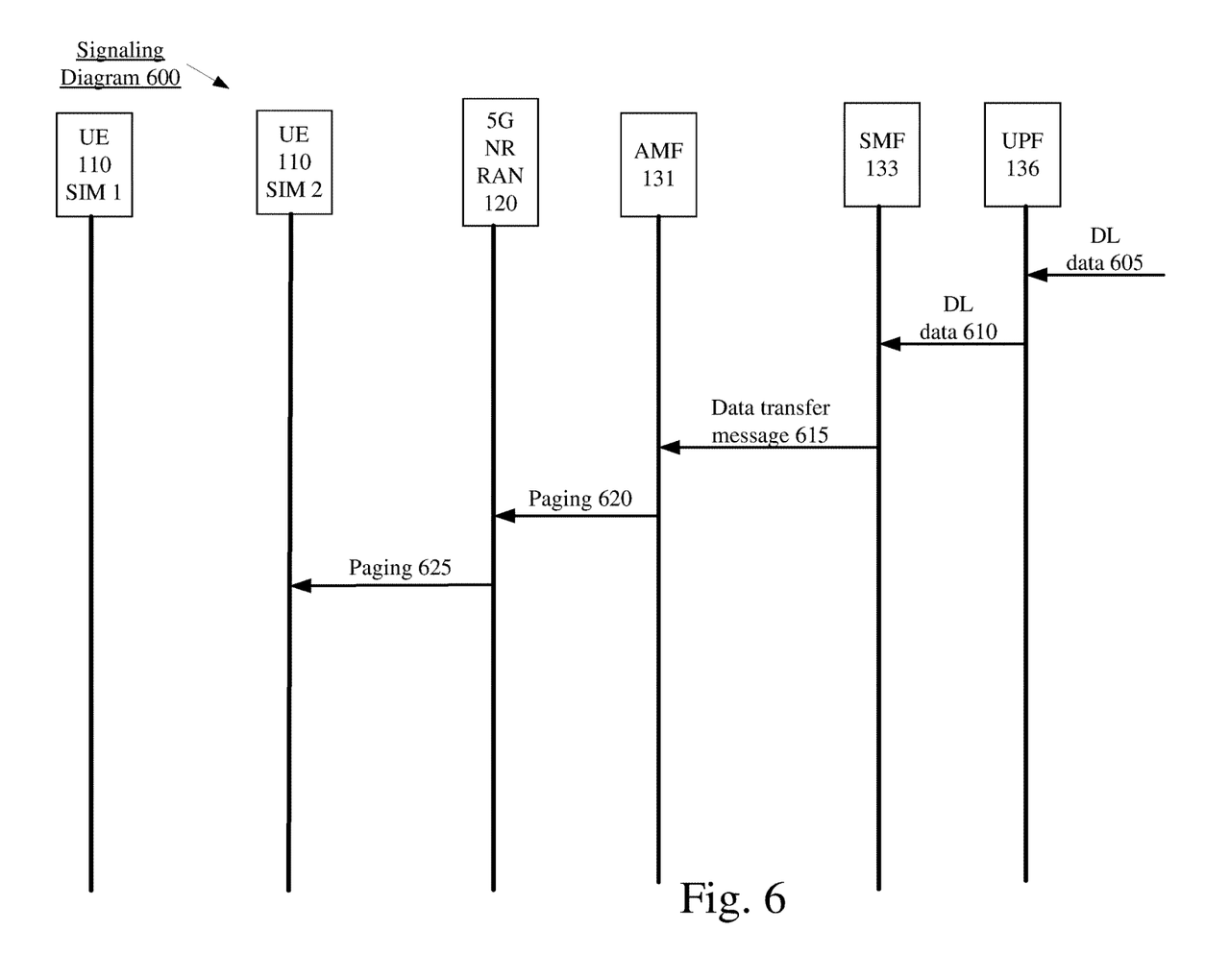
FIG. 6 shows an exemplary signaling diagram to perform paging for the multi-SIM device after registering using the signaling of FIG. 4.

FIG. 6 shows an exemplary signaling diagram 600 to perform paging for the multi-SIM device 110 after registering using the signaling 400 of FIG. 4. Again, it may be considered that the SIM 1 and SIM 2 of the UE 110 are registered with the AMF 131 and are assigned the same GUTI as described above with respect to FIG. 4. When the SIMs are registered, it may then be considered that there is downlink (DL) data available for one of the SIMs, in this example, SIM 2.

In 605, the downlink data is received at the User Plane Function (UPF) 136. The UPF 136 performs various functions within the core network 130 including packet routing and forwarding. In 610, the UPF 136 forwards the DL data to the SMF 133. In 615, the SMF 133 informs the AMF of the DL data that is available for the SIM 2 via a data transfer message. As described above, the SMF 133 maintains an understanding of the PDU(s) that are associated with each of the SIMS. The data transfer message may include the indicator that indicates the SIM with which the data transfer message 615 is associated.

The AMF 131, upon receiving the data transfer message will understand the SIM that is to be paged to indicate the availability of DL data (e.g., SIM 2 in this example). Again, this understanding is based on the identity information within the data transfer message 615. In 620, the AMF 131 may then send a paging message to the RG NR-RAN 120 that is then used to page the correct SIM 2 of the UE 110. Thus, in 625, a page is transmitted to SIM 2 of the UE 110.

Thus, in the above examples, it can be seen that the registration signaling 400 associated with FIG. 4 will result in the SIM 1 and the SIM 2 having the same GUTI. While this minimizes signaling associated with mobility management, it may cause issues with respect to other operations such as data transfers, paging etc., e.g., because the network does not understand to which SIM the data is to be directed. However, this issue is resolved by adding an identifier to each PDU session that relates the PDU session to a particular SIM. Thus, any issues related to the SIM 1 and the SIM 2 having the same GUTI are resolved, thereby allowing for reduced signaling without presenting any issues for other operations.

In addition to the above examples, the SMF 133 may also perform other management functions with respect to the PDU(s), such as modifying the PDU session. The SMF 133 will maintain the identification of the SIM throughout the life of a PDU session such that any changes to the PDU session will not result in a decoupling of the PDU session from the identification. In this manner, as long as the PDU session is active, the SMF 133 will understand the SIM associated with the PDU session.

Figure 7:
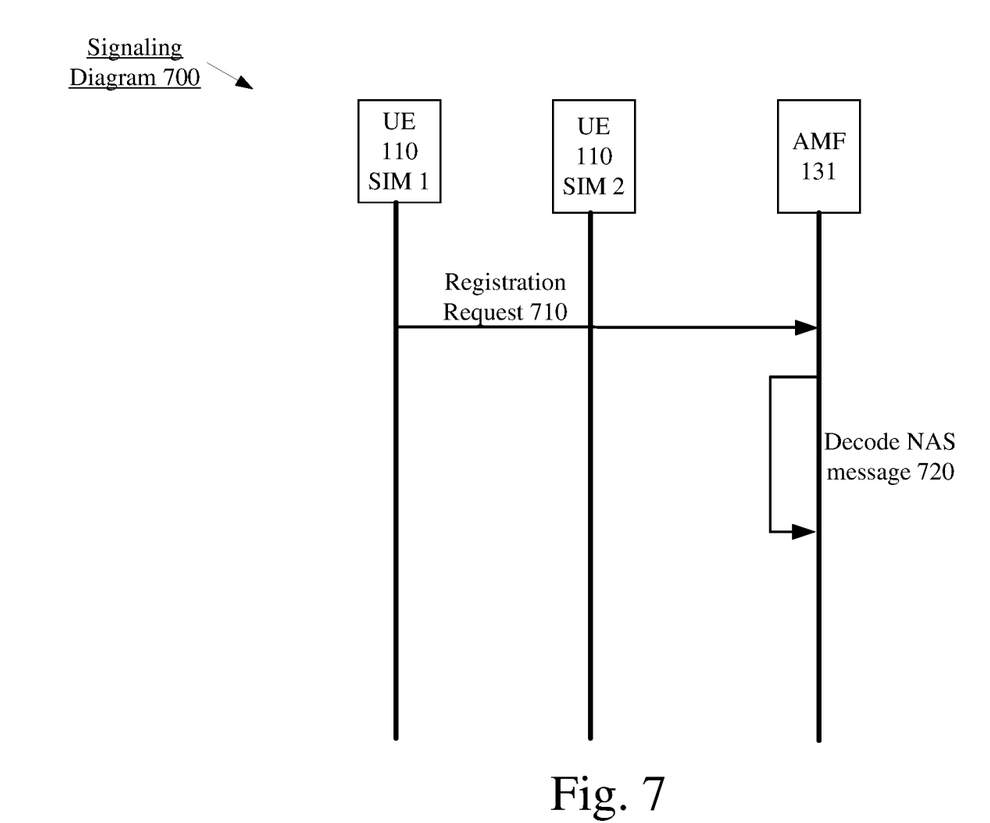
FIG. 7 shows a third exemplary signaling diagram showing control plane signaling for registering a multi-SIM device according to various exemplary embodiments.

FIG. 7 shows a third exemplary signaling diagram 700 showing control plane signaling for registering a multi-SIM device 110 according to various exemplary embodiments. FIG. 7 will be described with regard to the network arrangement 100 of FIG. 1 and the UE 110 of FIG. 2.

In this exemplary embodiment, in 710, SIM 1 (or SIM 2) may send a registration request to the AMF 131. Those skilled in the art will understand that other operations may be performed prior to the registration request being sent to the AMF 131 (e.g., operations similar to operations 305-315 of FIG. 3). The registration request may include a device identification of the UE 110 and a NAS message for both SIM 1 and SIM 2. Those skilled in the art will understand that the registration request may also include other types of information.

In 720, the AMF 131, upon receiving the registration request, may decode both NAS messages. The AMF will then understand that the SIM 1 and the SIM 2 are included in the UE 110 based on the device identification and the NAS messages in the registration request sent in 710. Thus, in this exemplary embodiment, the SIM 1 and the SIM 2 are registered with the same AMF 131 and the AMF 131 associates the SIM 1 and SIM 2 with each other, thereby again saving signaling during mobility management operations.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method comprising:
   at a user equipment (UE) comprising a first subscriber identification module (SIM) and a second SIM, wherein the UE is configured to establish a first cellular network connection based on, at least, the first SIM and a second cellular network connection based on, at least, the second SIM:
   sending, by the first SIM, a first registration request to a network, wherein the first registration request comprises an identification indicating the UE is a type of multi-SIM device;
   receiving, by the first SIM, a first registration accept message indicating the first registration request has been accepted, wherein the first registration accept message comprises a first temporary identification for the first SIM; and
   sending, by the second SIM, an access network message comprising a second temporary identification based on, at least, the first temporary identification, wherein the first temporary identification and the second temporary identification are different.

2. The method of claim 1, further comprising:
   sending, by the second SIM, a second registration request including the second temporary identification.

3. The method of claim 2, further comprising:
   receiving, by the second SIM, a second registration accept message indicating that the second registration request has been accepted, the second registration accept message including the second temporary identification assigned to the second SIM, wherein the second temporary identification is different from the first temporary identification.

4. The method of claim 2, further comprising:
   receiving, by the second SIM, a registration reject message indicating that the second registration request has been rejected by the network, the registration reject message comprising an indication that the second SIM is to share a non-access stratum (NAS) procedure with the first SIM.

5. A user equipment (UE), comprising:
   a first subscriber identification module (SIM);
   a second SIM;
   a transceiver configured to establish a first cellular network connection based on, at least, the first SIM and a second cellular network connection based on, at least, the second SIM; and
   a processor configured to send a first registration request to a network for the first SIM, wherein the first registration request comprises an identification indicating the UE is a type of multi-SIM device, receive a first registration accept message indicating the first registration request has been accepted, wherein the first registration accept message comprises a first temporary identification for the first SIM and send an access network message for the second SIM comprising a second temporary identification based on, at least, the first temporary identification, wherein the first temporary identification and the second temporary identification are different.

6. The UE of claim 5, wherein the processor is further configured to send a second registration request for the second SIM including the second temporary identification.

7. The UE of claim 6, wherein the processor is further configured to receive a second registration accept message indicating that the second registration request has been accepted, the second registration accept message including the second temporary identification assigned to the second SIM, wherein the second temporary identification is different from the first temporary identification.

8. The UE of claim 6, wherein the processor is further configured to receive a registration reject message indicating that the second registration request has been rejected by the network, the registration reject message comprising an indication that the second SIM is to share a non-access stratum (NAS) procedure with the first SIM.

9. A method, comprising:
at a network:
receiving a first registration request from a first SIM of a multi-SIM device, wherein the first registration request comprises an identification indicating the multi-SIM device is a type of multi-SIM device;
assigning the first SIM to a mobility management function of the network;
sending a first registration accept message to the first SIM indicating the registration was successful and further including a first temporary identification assigned to the first SIM; and
receiving, from a second SIM, an access network message a second temporary identification based on, at least, the first temporary identification, wherein the first temporary identification and the second temporary identification are different.

10. The method of claim 9, further comprising:
assigning the second SIM to the mobility management function of the network based on, at least, the second temporary identification.

11. The method of claim 10, further comprising:
receiving a second registration request from the second SIM of the multi-SIM device, wherein the second registration request includes the second temporary identification.

12. The method of claim 11, further comprising:
sending a second registration accept message to the second SIM indicating the second registration was successful and further including the second temporary identification assigned to the second SIM, wherein the second temporary identification is different from the first temporary identification.

13. The method of claim 11, further comprising:
sending a registration reject message indicating that the second registration request has been rejected, the registration reject message comprising an indication that the second SIM is to share a non-access stratum (NAS) procedure with the first SIM, wherein the second SIM and the first SIM are identified by the same first temporary identification.

14. The method of claim 13, further comprising:
receiving a service request from the first SIM, wherein the service request comprises a request for a PDU session with the network; and
creating the PDU session, wherein information relating to the PDU session includes a unique identifier associating the PDU session with the first SIM.

15. The method of claim 14, further comprising:
receiving downlink (DL) data that is destined for the first SIM;
selecting the PDU session to send the DL data to the first SIM, wherein the selecting is based on, at least, the unique identifier associating the PDU session with the first SIM; and
paging the first SIM to indicate the DL data is available.

16. The method of claim 9, wherein the network is a 5G New Radio (NR) radio access network (RAN).

17. The method of claim 9, wherein the mobility management function comprises an Access and Mobility Management Function (AMF).

18. The method of claim 9, wherein the second temporary identification comprises a Serving Temporary Mobile Subscriber Identity (S-TMSI).

* * * * *